(12) United States Patent
Collazo Gomez et al.

(10) Patent No.: US 10,308,210 B2
(45) Date of Patent: Jun. 4, 2019

(54) METHOD OF FOLDING AN AIRBAG, AIRBAG, AIRBAG MODULE AND VEHICLE SAFETY SYSTEM

(71) Applicant: Dalphi Metal Espana S.A., Vigo (ES)

(72) Inventors: Angel Collazo Gomez, Vigo (ES); Ramon Bana Castro, Vigo (ES)

(73) Assignee: DELPHI METAL ESPANA S.A., Vigo (ES)

(*) Notice: Subject to any disclaimer, the term of this patent is extended or adjusted under 35 U.S.C. 154(b) by 38 days.

(21) Appl. No.: 15/627,626

(22) Filed: Jun. 20, 2017

(65) Prior Publication Data

US 2017/0369026 A1      Dec. 28, 2017

(30) Foreign Application Priority Data

Jun. 27, 2016    (DE) .......................... 10 2016 007 748

(51) Int. Cl.
*B60R 21/237*   (2006.01)
*B60R 21/013*   (2006.01)
*B60R 21/203*   (2006.01)

(52) U.S. Cl.
CPC .......... *B60R 21/237* (2013.01); *B60R 21/013* (2013.01); *B60R 21/203* (2013.01)

(58) Field of Classification Search
CPC ............................. B60R 21/237; B60R 21/203
See application file for complete search history.

(56) References Cited

U.S. PATENT DOCUMENTS

| | | | | |
|---|---|---|---|---|
| 5,520,408 A * | 5/1996 | Niederman | ........... | B60R 21/203 280/728.1 |
| 5,803,483 A * | 9/1998 | Lunt | ........... | B60R 21/237 280/728.1 |
| 6,092,839 A * | 7/2000 | Nagano | ........... | B60R 21/237 280/743.1 |
| 6,176,509 B1 * | 1/2001 | Kawaguchi | ........... | B60R 21/237 280/728.1 |
| 6,206,409 B1 | 3/2001 | Kato et al. | | |
| 6,286,866 B1 * | 9/2001 | Satge | ........... | B60R 21/237 280/743.1 |
| 6,299,202 B1 * | 10/2001 | Okada | ........... | B60R 21/233 280/732 |
| 6,547,279 B1 | 4/2003 | Amamori | | |
| 6,945,557 B2 * | 9/2005 | Takimoto | ........... | B60R 21/206 280/730.1 |
| 7,445,239 B2 * | 11/2008 | Okada | ........... | B60R 21/237 280/743.1 |

(Continued)

*Primary Examiner* — Faye M Fleming
(74) *Attorney, Agent, or Firm* — Tarolli, Sundheim, Covell & Tummino LLP

(57) ABSTRACT

The invention relates to a method of folding an airbag (10), especially a driver airbag module, comprising a front airbag layer (11) which is connected at feast in portions to a rear airbag layer (12), the method comprising the following steps of:
a) flatly spreading the airbag (10) onto a support surface (15) so that the front airbag layer (11) comes to rest on the rear airbag layer (12),
b) folding, especially zigzag folding, at least in portions each of an upper airbag portion (20) and a lower airbag portion (21) in the direction of a transverse axis (Q) of the airbag (10),
c) furling each of a left-hand lateral airbag portion (30) and a right-hand lateral airbag portion (31) in the direction of a longitudinal axis (L) of the airbag (10).

16 Claims, 7 Drawing Sheets

(56) References Cited

U.S. PATENT DOCUMENTS

| | | | |
|---|---|---|---|
| 7,571,933 B2* | 8/2009 | Thomas | B60R 21/203 |
| | | | 280/743.1 |
| 8,540,276 B2* | 9/2013 | Schneider | B60R 21/206 |
| | | | 280/730.1 |
| 8,960,713 B2* | 2/2015 | Kim | B60R 21/206 |
| | | | 280/730.1 |
| 9,227,591 B2* | 1/2016 | Sano | B60R 21/205 |
| 9,656,625 B2* | 5/2017 | Jung | B60R 21/206 |
| 2005/0134032 A1* | 6/2005 | Downing | B60R 21/237 |
| | | | 280/743.1 |
| 2006/0055157 A1 | 3/2006 | Ishiguro et al. | |
| 2018/0056923 A1* | 3/2018 | Kang | B60R 21/2338 |

* cited by examiner

METHOD OF FOLDING AN AIRBAG, AIRBAG, AIRBAG MODULE AND VEHICLE SAFETY SYSTEM

RELATED APPLICATION

The application claims priority from German Application No. 10 2016 007 748.4, filed Jun. 27, 2016, the subject matter of which is incorporated herein by reference in its entirety.

BACKGROUND OF THE INVENTION

The invention relates to a method of folding an airbag, especially for a driver airbag module, comprising a front airbag layer which is connected at least in portions to a rear airbag layer. Apart from that, the invention relates to a folded airbag and an airbag module as well as a vehicle safety system comprising said airbag.

Occupant restraint systems for automotive vehicles usually include airbag modules comprising an airbag which in the case of impact is inflated so as to reduce the probability of body parts of a vehicle occupant colliding with a vehicle component. Some of these airbag modules are provided for being fixed in the steering wheel of an automotive vehicle as a driver airbag module. Accordingly, the airbag is arranged in a casing of the airbag module in a folded state, wherein it is especially important that the folded airbag, i.e. the airbag package, occupies a minimum volume. It is further important that in the case of release the airbag can deploy in a spilt second. Hence the development of new folding techniques of airbags aims at folding the airbag to an as small size as possible so as to minimize the storage space required while ensuring unhindered deployment of the airbag.

SUMMARY OF THE INVENTION

It is the object of the invention to state a method alternative to known methods which enables an airbag to be folded, especially an as small volume as possible of a folded airbag to be produced. Furthermore it is to be ensured by the method that in a case of crash the airbag can treaty deploy and inflate, preferably in a directed manner. It is another object of the invention to provide such folded airbag and an airbag module as well as a vehicle safety system comprising such folded airbag.

In accordance with the invention, this object is achieved with respect to the method of folding an airbag by the subject matter of claim 1, with respect to the folded airbag by claim 4 or 5, with respect to the airbag module by the subject matter of claim 9 and with respect to the vehicle safety system by the subject matter of claim 10.

The invention is based on the idea to state a method of folding an airbag which is designed especially for a driver airbag module comprising a front airbag layer which is connected at least in portions to a rear airbag layer, the method comprising the following steps of:
  a) flatly spreading the airbag onto a support surface so that the front airbag layer comes to rest on the rear airbag layer,
  b) folding at least in portions, especially zigzag folding, each of an upper airbag portion and a lower airbag portion in the direction of a transverse axis of the airbag,
  c) furling each of a left-hand lateral airbag portion and a right-hand lateral airbag portion in the direction of a longitudinal axis of the airbag.

The advantage of the method according to the invention consists in the fact that a reproducible folding of an airbag can be achieved by method steps that are easy to carry out. Moreover, the invention provides a method in which the airbag can be folded into an especially small volume, as no means such as compressed air have to be introduced to the airbag. In addition, the method enables a directed inflating behavior of the airbag to be obtained.

The front airbag layer is the layer of the airbag which in the inflated state faces the vehicle occupant and especially the driver. The rear airbag layer is the airbag layer of the airbag which in the inflated state faces the vehicle components, especially the instrument panel.

The front airbag layer is connected, especially stitched and/or welded, at least in portions to the rear airbag layer.

In step a) this arrangement of front and rear airbag layers is flatly spread on a support surface. For example a table or a desk may serve as a support surface. The airbag is spread on the support surface so that the front airbag layer comes to rest on the rear airbag layer. The person folding the airbag consequently looks onto the front airbag layer, whereas the rear airbag layer rests on the support surface.

When spreading the airbag flatly onto a support surface, care has to be taken that during folding no big forces are applied to seams intended to tear in the inflated state.

In step b) there follow folding at least in portions, especially zigzag folding, of each of an upper airbag portion and a lower airbag portion in the direction of a transverse axis of the airbag. The upper airbag portion is the upper airbag portion which is visible in a top view onto the airbag. The lower airbag portion is the lower segment of the airbag visible in a top view onto the airbag. The transverse axis of the airbag extends from the left to the right in a top view, i.e. when the airbag is viewed by the person folding the airbag.

In step c) each of a left-hand lateral airbag portion and a right-hand lateral airbag portion is furled in the direction of a longitudinal axis of the airbag. In this context, too, it is applicable that the left-hand lateral airbag portion and the right-hand lateral airbag portion are resulting from a top view onto the airbag, i.e. when the airbag is viewed by a person folding the same. The longitudinal axis of the airbag extends from the top to the bottom in the described top view.

The longitudinal axis and the transverse axis are preferably arranged substantially perpendicularly to each other and extend substantially normal to each other. By substantially normal also deviations from a right angle of +/−10° especially of +/−5° especially of +/−2° are to be understood in this context.

In a top view onto the airbag, the longitudinal axis extends through a 6 o'clock position and a 12 o'clock position of the airbag.

The transverse axis preferably extends through a 3 o'clock position and a 9 o'clock position of the airbag.

The given 3, 8, 9 and 12 o'clock positions of the airbag are defined with respect to the orientation of the airbag typically mounted and inflated in the steering wheel and the vehicle, respectively.

It is possible that at a/the 12 o'clock position of the airbag and/or extending from the middle to a/the 12 o'clock position of the airbag a gas discharge device is formed. A gas discharge device may consist of vents, as they are called. A so called vent enables gas to escape from the airbag in the inflated state. There are known, for example, so called self-adaptive vents (SAV) and/or flap vents. The airbag folded in accordance with the invention may comprise both a self-adaptive vent and a flap vent. Moreover, it is possible that the airbag comprises seams which tear when a particular stress/load is applied.

The airbag to be folded in accordance with the invention may further include a tether device, especially a restraint and/or tether strap, wherein the tether device, especially a restraint and/or a tether strap and/or a tether seam, is positioned so that it extends along the longitudinal axis or substantially in parallel to the longitudinal axis. This prevents strong twisting and/or kinking inside the airbag so that the tether device can work properly also in the inflated state of the airbag folded in accordance with the invention.

Prior to step a) an inflator and/or an airbag fixture may be placed, preferably centrally, in a clearance formed by the front airbag layer and the rear airbag layer, in other words, the clearance constitutes the airbag interior. Therein, preferably before the airbag is flatly spread, an inflator preferably having a circular cross-section and/or the airbag fixture have to be placed. The airbag fixture may be, for example, a holder plate including fasteners, especially screws and/or bolts, arranged thereon. Folding, especially zigzag folding, of the upper and/or lower airbag portions as well as furling of the two lateral airbag portions preferably is performed such that the inflator and/or the airbag fixture are not displaced. Of preference, the rear airbag layer includes openings through which the fasteners of the airbag fixture can be guided.

When placing the airbag fixture, especially the fasteners of the airbag fixture, it is important to take care that they do not impair a/the tether device during positioning inside the airbag interior and inside the clearance, respectively.

It is further possible that an airbag sheath is provided. The airbag sheath is arranged on the rear airbag layer, preferably connected to the rear airbag layer. When carrying out the method, the airbag sheath is located beneath the rear airbag layer. The airbag sheath is preferably located between the support surface and the rear airbag layer. Especially preferred, the airbag sheath is not folded, i.e. neither folded nor furled, when the method of folding an airbag is implemented. The airbag sheath preferably remains flatly on the support surface when implementing the method according to the invention.

Especially when carrying out step b), between the upper airbag portion and the lower airbag portion a center strip which is not laid, especially not folded, is formed which extends especially on the transverse axis or in parallel to the transverse axis. That is to say that especially in step b) such non-reversed, especially non-folded center strip is formed such that the inflator and/or the airbag fixture, for example, need not be displaced for folding the inflator.

Preferably in step b) for zigzag folding a first airbag portion that corresponds either to the lower and/or to the upper airbag portion and in particular constitutes the upper airbag portion, a first folding blade is aligned substantially in parallel to the transverse axis and placed substantially vertically onto the front airbag layer so that a lateral edge of a/the center strip is formed, wherein subsequently the first airbag portion, especially a 12 o'clock position portion and/or a 6 o'clock position portion of the airbag, especially preferred a 12 o'clock position portion of the airbag, is folded in the direction of the first folding blade so that the front airbag layer is laid over the first folding blade and at least one surface portion of the rear airbag layer is aligned substantially perpendicularly to the support surface.

The folding blade is considered to be such aid which is in the form of a ruler. By means of the height of the folding blade, i.e. the blade height, the width of a fold is defined. Preferably the folding blade has such length that the folding blade is longer than the width of the airbag. The width of the airbag is to be understood as the extension along the transverse axis of the airbag.

In a further method step which belongs to the step b) preferably a second folding blade is put against the surface portion of the rear airbag layer and subsequently the first airbag portion is laid over the second folding blade so that a first folding portion is formed between the first folding blade and the second folding blade and a first folding bend is formed over the second folding blade and adjacent to the first folding bend a second folding portion is formed.

A folding bend is considered to be the connecting point between two folding portions. Starting from the folding bend a fold opening is formed between two folding portions. Such fold opening extends in the state of the method step b) substantially perpendicularly to the support surface. Hence, due to the zigzag folding, a concertina-like folding is resulting which is formed to stand upright on the support surface.

In another sub-step of step b) preferably a third folding blade is put against the second folding portion and subsequently the first airbag portion is folded toward the third folding blade so that the front airbag layer is laid over the third folding blade and at least one surface portion of the rear airbag layer is aligned substantially perpendicularly to the support surface and subsequently a fourth folding blade is put against the surface portion of the rear airbag layer and after that the first airbag portion is laid over the fourth folding blade so that beneath the third folding blade a second folding bend is formed and between the third folding blade and the fourth folding blade a third folding portion is formed and above the fourth folding blade a third folding bend is formed and adjacent to the third folding bend a fourth folding portion is formed.

Preferably, for carrying out the method step b) plural folding blades are used. They may be inserted in holding fixtures arranged on the side of the airbag so that the individual folding blades need not be held by a person. Alternatively and/or additionally it is imaginable that merely two folding blades are used, with the previously used first folding blade, for example, being used as the third folding blade. The previously used second folding blade, for example, may be used as the fourth folding blade. For this purpose it is required, however, that the already formed folding portions and/or folding bends are caught by means of clips or similar holding fixtures. In other words, the third folding blade may be a third folding blade to be used.

Preferably the steps for zigzag folding including at least six folding blades are carried out so many times that at least five folding bends and at least six folding portions are formed.

The folding bends may also be referred to as folding edges and folds, respectively, and/or may be configured as folding edges and folds, respectively. Due to a relatively thick airbag material and the two-ply configuration during folding of the airbag, respectively, folding edges are not necessarily recognizable as such.

Of preference, prior to carrying out step c), the folding portions of the first airbag portion are turned over in the direction of the transverse axis such that the first folding portion rests on the center strip, wherein preferably the folding blades are additionally removed, in other words, it is provided that prior to carrying out step c) the zigzag folds whose openings extend substantially perpendicularly to the support surface are folded over such that the openings of the zigzag folds extend substantially in parallel to the support surface. For this, the first folding portion rests on the center strip, especially on the non-reversed and, resp., unfolded center strip. The folding blades can be removed prior to turning over the folding portions and/or after turning over the folding portions.

Preferably the folding portions and/or the folding bends are held together after turning over in the direction of the transverse axis by means of clips or similar fixing means.

In a preferred embodiment of the invention, in step b) for zigzag folding a further, especially a second, airbag portion corresponding either to the lower airbag portion or to the upper airbag portion and preferably being the lower airbag portion, a first folding blade is aligned substantially in parallel to the transverse axis and is placed substantially perpendicularly onto the front airbag layer so that a lateral edge of a/the center strip is formed. After that the second airbag portion, especially a 12 o'clock position portion or a 6 o'clock position portion of the airbag, especially preferred a 6 o'clock position portion of the airbag, is folded in the direction of the first folding blade so that the front airbag layer is laid over the first folding blade and at least one surface portion of the rear airbag layer is aligned substantially perpendicularly to the support surface. During zigzag folding of the second airbag portion, the first folding blade is arranged more distant from the center of the airbag than a/the first folding blade during zigzag folding of a/the first airbag portion.

Of preference, during zigzag folding of the second airbag portion a perpendicular is adjusted from the center of the airbag to the first folding blade, the perpendicular amounting to 90 mm-150 mm, especially 100 mm-140 mm, especially 110 mm-130 mm, especially 115 mm-125 mm, especially 120 mm, wherein a broadened center strip portion is formed between the first folding blade and the center of the airbag.

In a preferred embodiment of the invention a second folding blade is put against the surface portion of the rear airbag layer and subsequently the second airbag portion is laid over the second folding blade so that between the first folding blade and the second folding blade a first folding portion is formed and above the second folding blade a first folding bend is formed and adjacent to the first folding bend a second folding portion is formed.

Moreover, a third folding blade is preferably put against the second folding portion and subsequently the second airbag portion is folded in the direction of the third folding blade so that the front airbag layer is laid over the third folding blade and at least one surface portion of the rear airbag layer is aligned substantially perpendicularly to the support surface. After that, a fourth folding blade is put against the surface portion of the rear airbag layer and then the second airbag portion is laid over the fourth folding blade so that beneath the third folding blade a second folding bend is formed and between the third folding blade and the fourth folding blade a third folding portion is formed and above the fourth folding blade a third folding bend is formed and adjacent to the third folding bend a fourth folding portion is formed.

Especially preferred, a first airbag portion, especially the upper airbag portion, and a second airbag portion, especially the tower airbag portion, are folded, and especially zigzag folded, in a different way. In particular in connection with the second airbag portion, a broadened center strip portion is formed. The first airbag portion and the second airbag portion are configured to be especially non-symmetrical to the transverse axis of the airbag. They rather include different foldings and/or folding portions.

Before carrying out step c) the folded second airbag portion is laid in the direction of the transverse axis of the airbag such that initially the broadened center strip portion and/or the first folding portion is/are guided in the direction of the transverse axis of the airbag so as to subsequently lay a last, especially fourth, folding portion onto the rear airbag layer of the broadened center strip portion and/or of the first folding portion. In other words, the last folding portion is preferably turned over so that it does not come to rest on the uppermost position of the second airbag portion but is rather covered by another folding portion of the second airbag portion.

Preferably, the folding portions of the upper airbag portion and the folding portions of the lower airbag portion are turned over in the direction of the transverse axis such that a/the inflator which is/was placed in a/the clearance formed by the front airbag layer and the rear airbag layer is covered. In other words, both the folding portions of the upper airbag portion and the folding portions of the lower airbag portion are turned over in the direction of the transverse axis, with an inflator and/or an airbag fixture being covered by the upper and lower airbag portions. By covering in this context no direct resting on the inflator is to be understood. Above the inflator especially an upper airbag layer of the center strip is provided. Hence covering is to be understood as covering of the front airbag layer which is arranged in the area of the inflator and/or the airbag fixture.

In step b) both the upper airbag portion and the lower airbag portion are folded, especially zigzag folded. It is possible that first the upper airbag portion and then the lower airbag portion is folded. A reverse order is imaginable as well. Immediately before carrying out step c) possibly provided clips and/or fasteners have to be removed.

In step c) a left-hand and/or a right-hand lateral airbag portion, especially a 3 o'clock position portion and/or a 9 o'clock position portion of the airbag is furled starting from a lateral edge of the airbag, especially with the aid of a roll blade, in the direction of the longitudinal axis of the airbag, wherein preferably a/the inflator which is/was placed in a/the clearance formed by the front airbag layer and the rear airbag layer is not covered, at least in portions, by the left-hand and/or the right-hand lateral airbag portion.

Preferably, first the right-band lateral airbag portion and then the left-hand lateral airbag portion will be furled. An order of proceeding deviating herefrom is possible, too.

Furling of the left-hand lateral airbag portion and/or the right-hand lateral airbag portion may be performed by means of a roll blade. This again is a ruler-type element which, starting from a lateral edge of the airbag for furling the left-hand and/or right-hand lateral airbag portion remains inside the furled airbag portion until a final position is reached.

In other words, the inflator at least in portions remains free from the left-hand and/or right-hand lateral airbag portion.

The right-hand lateral airbag portion and/or the left-hand lateral airbag portion comprise portions of the folded upper airbag portion and of the folded lower airbag portion.

After carrying out step c), folding of an airbag sheath can be performed in a step d). For this purpose, the airbag sheath may be put around the folded airbag, for example.

The folded airbag may be positioned in a module casing. This is preferably effectuated along with a/the airbag sheath.

Within the scope of another aspect, the invention is based on the idea to state an airbag that was folded following an afore-mentioned method according to the invention. There are resulting advantages similar to those explained already in connection with the afore-mentioned method according to the invention.

Another independent aspect of the invention relates to a folded airbag, especially for a driver airbag module, comprising a front airbag layer that is connected at least in portions to a rear airbag layer.

In accordance with the invention, the folded airbag includes an upper airbag portion, a lower airbag portion, a left-hand lateral airbag portion and a right-hand lateral airbag portion, each of the upper airbag portion and the lower airbag portion being folded, especially zigzag folded, and each of the left-hand lateral airbag portion and the right-hand lateral airbag portion being furled toward the middle of the airbag. Concerning the terms "upper, lower", "left-hand lateral" and "right-hand lateral", the foregoing explanations are referred to.

Preferably the upper airbag portion or the lower airbag portion is folded, especially zigzag folded, such that a first folding portion of the upper airbag portion or of the lower airbag portion rests on a canter strip of the front airbag layer so that an inflator placed or adapted to be placed in a clearance formed by the front airbag layer and the rear airbag layer is covered at least in portions by the upper airbag portion or the lower airbag portion. In this respect, advantages similar to those stated already in connection with the methods according to the invention are resulting.

In a preferred embodiment of the invention, the upper airbag portion or the lower airbag portion is folded, especially zigzag folded in portions, such that a broadened center strip portion rests on a/the center strip so that an/the inflator placed or adapted to be placed in a/the clearance formed by the front airbag layer and the rear airbag layer is covered at least in portions by the upper airbag portion or the lower airbag portion, with a last folding portion, viewed starting from the middle of the airbag, resting on the rear airbag layer of the broadened center strip portion and/or of a first folding portion.

It is further possible that an/the inflator placed or adapted to be placed in a/the clearance formed by the front airbag layer and the rear airbag layer is not covered at least in portions, preferably completely, by the left-hand and/or the right-hand lateral airbag portion. In other words, the inflator is free of the left-hand and/or right-hand lateral airbag portion at least in portions, preferably completely. In this context, covering is equally intended to mean that the material of each of the mentioned airbag portions does not rest directly on the inflator but on the front airbag layer formed above the inflator.

Another independent aspect of the invention relates to an airbag module, especially for arrangement in a steering wheel, comprising an airbag according to the invention and/or an airbag that was folded following a method according to the invention. The airbag module further comprises an inflator for inflating the airbag.

There are resulting advantages similar to those already stated in connection with the method according to the invention for folding an airbag and/or in connection with the airbag folded according to the invention.

Another independent aspect of the invention relates to a vehicle safety system, especially a driver airbag module, comprising an airbag folded according to the invention and/or comprising an airbag folded following a method according to the invention and/or comprising an airbag module according to the invention, and wherein at least one sensor unit for detecting data as well as an electronic decision-making unit is provided which is suited, incorporating the data detected by the sensor unit, for defining the presence of a trigger case for the airbag module and/or for transmitting a trigger signal to the airbag module. There are resulting advantages similar to those already stated in connection with the method according to the invention for folding an airbag and/or with the airbag module according to the invention.

BRIEF DESCRIPTION OF THE DRAWINGS

Hereinafter the invention shall be illustrated by way of embodiments with reference to the enclosed schematic drawings, in which:

Hereinafter the same reference numerals ere used for equal and equally acting parts.

In FIG. 1a an airbag 10 is shown in a state spread on a support surface 15. The support surface 15 is the surface of a working table or a desk, for example.

Figure 1A:
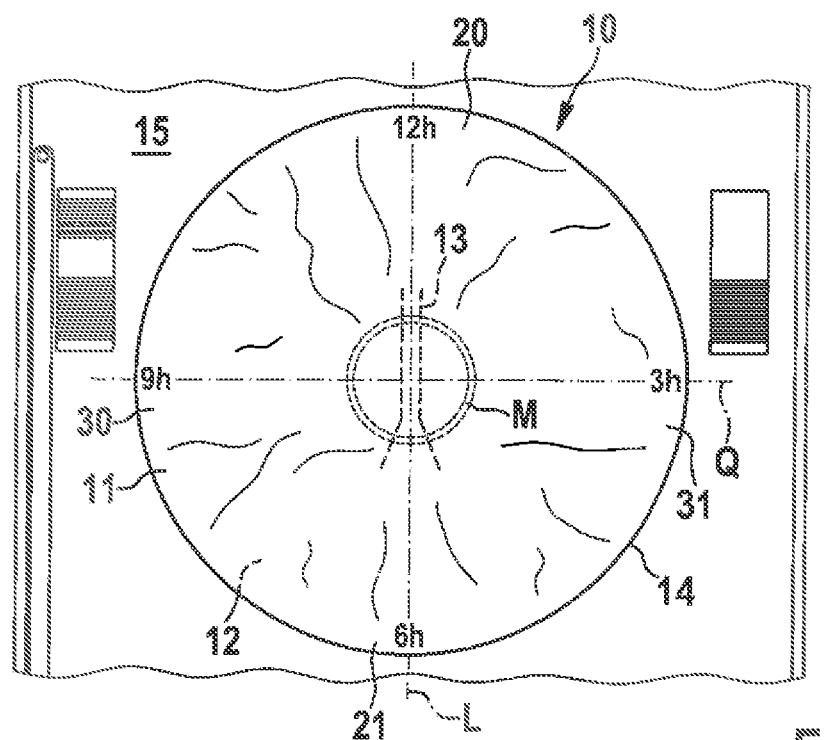
FIGS. 1a and 1b show two different embodiments of airbags spread on a support surface.

The airbag 10 includes a front airbag layer 11 and a rear airbag layer 12. The rear airbag layer 12 is not visible in the representation as it rests on the support surface 15. The front airbag layer 11 is visible which is connected, especially stitched and/or welded, at least in portions to the rear airbag layer 12. When flatly spreading the airbag 10 onto the support surface 15, care has to be taken that no forces are applied to the seams intended to tear in the inflated state of the airbag 10 during the subsequent method steps.

The representation of FIG. 1 corresponds to the viewing direction of a person folding the airbag 10 lying in front of her/him. A longitudinal axis L and a transverse axis Q are visible. The airbag 10 may be divided into an upper airbag portion 20, a lower airbag portion 21, a left-hand lateral airbag portion 30 and a right-hand lateral airbag portion 31. The given 3, 6, 9 and 12 o'clock positions of the airbag 10 are defined with respect to the orientation of the airbag typically mounted and inflated in the steering wheel and the vehicle, respectively. The longitudinal axis L extends through the 6 o'clock position and through the 12 o'clock position. The transverse axis Q, on the other hand, extends through the 3 o'clock position and the 9 o'clock position of the airbag 10. The longitudinal axis L and the transverse axis Q are substantially perpendicular to each other.

A tether device 13 is indicated which especially comprises at least one restraint and/or at least one tether strap. The tether device 13 is positioned so that it extends in parallel to the longitudinal axis L.

In a clearance formed by the front airbag layer 11 and the rear airbag layer 12 an inflator (not shown) is already provided. The latter is preferably centrally placed. The middle M of the airbag 10 is evident by way of a circular seam. When positioning the inflator and an airbag fixture care has to be taken that neither the inflator nor an airbag fixture does impair the tether device 13.

A gas discharge device may be formed at the 12 o'clock position of the airbag 10 and, respectively, extending from the middle M to the 12 o'clock position of the airbag 10. The gas discharge device may be a so called flap vent, for example.

After having spread the airbag 10 flatly on the support surface 15, in a step b) the upper airbag portion 20 and the lower airbag portion 21 are zigzag folded in the direction of the transverse axis G of the airbag 10.

Figure 1B:
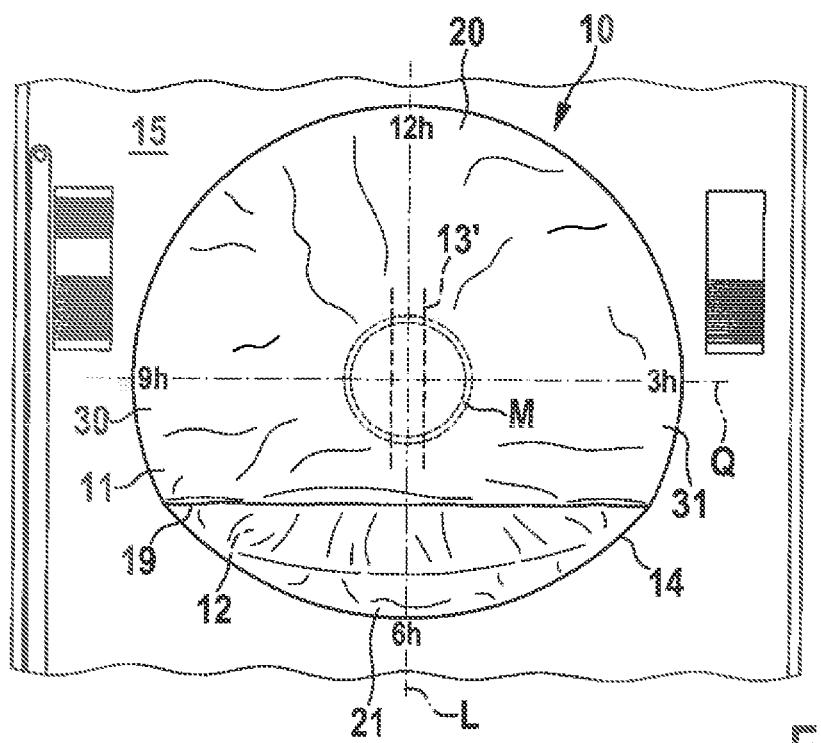

FIG. 1b illustrates another airbag 10 which includes a tether device 13' deviating from the embodiment according to FIG. 1a. The latter merely consists of two straight portions, whereas the tether device 13 of FIG. 1a includes bent portions in the lower segment.

The airbag according to FIG. 1b further comprises a gas discharge device, i.e. a so called self-adaptive vent visible on the edge portion 19.

The method steps shown in the following Figures may be carried out both in connection with an airbag 10 according to FIG. 1a and in connection with the airbag 10 shown in FIG. 1b.

Figure 2:
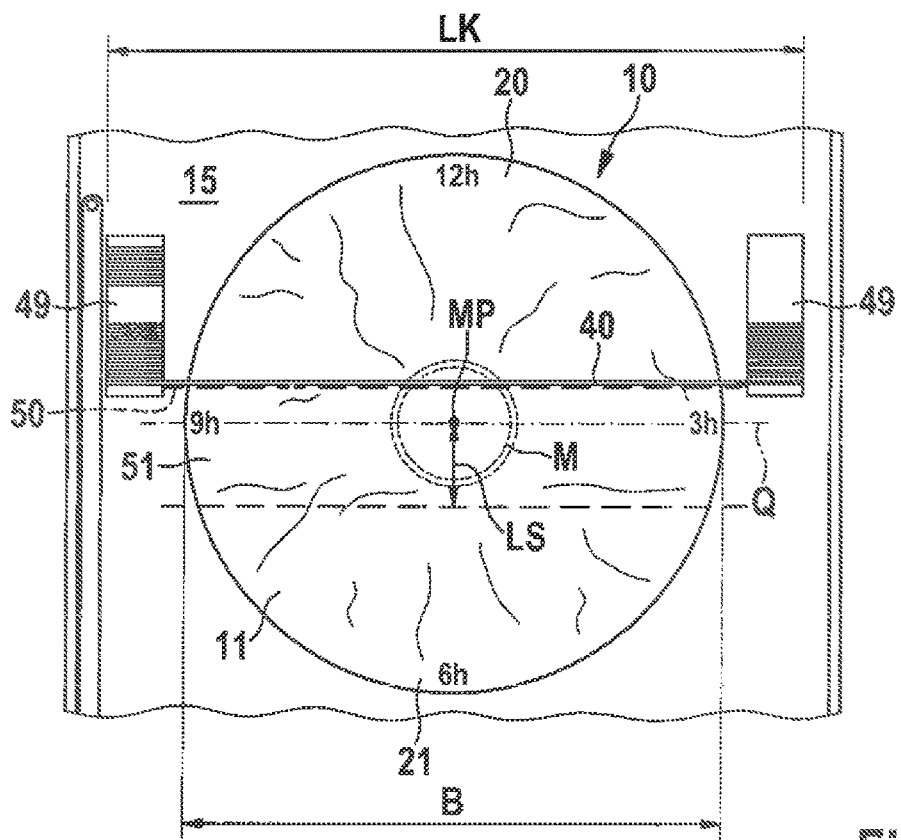
FIG. 2 to 6c show individual steps of the method according to the invention for folding an airbag.

As is illustrated in FIG. 2, a first folding blade 40 is aligned substantially in parallel to the transverse axis Q. The first folding blade 40 is put substantially perpendicularly onto the front airbag layer 11. Hence a lateral edge 60 of a center strip 51 extending in parallel to the transverse axis Q is formed. The center strip 51 is non-reversed, especially non-folded.

The first folding blade 40 is a ruler-type aid. The length LK of the first folding blade 40 is longer than the width B of the airbag 10. The first folding blade 40 may be inserted in holding fixtures 49 arranged on the right and on the left of the airbag 10.

In a further method step, the upper airbag portion 20, especially the portion of the airbag 10 comprising the 12 o'clock position, is folded in the direction of the first folding blade 40 so that the front airbag layer 11 is laid over the first folding blade 40 and at least one surface portion of the rear airbag layer 12 is aligned substantially perpendicularly to the support surface 15.

Figure 3:
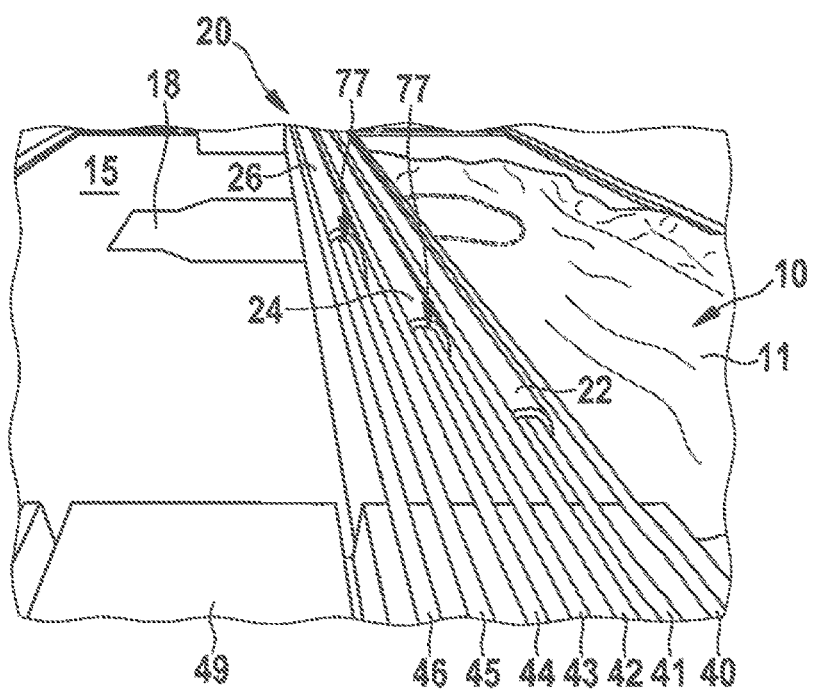

In FIG. 3 the airbag 10 is shown in a viewing direction from the 9 o'clock position. It is evident that the airbag 10 includes an airbag sheath 18. The latter initially is not folded and rather will stay resting on the support surface 15. As can be inferred from FIG. 3, the folding operation is carried out by a total of six folding blades, i.e. the first folding blade 40, the second folding blade 41, the third folding blade 42, the fourth folding blade 43, the fifth folding blade 44 and the sixth folding blade 45. A seventh folding blade 46 is provided to retain the entire upper airbag portion 20 in its folded shape. Above and, resp., beneath the folding blades folding bends are formed (cf. FIG. 4b in this context). Said folding bends interconnect the individual folding portions. The zigzag folding operation in connection with the upper airbag portion 20 is carried out with the lower airbag portion 21 as well.

Figure 4A:
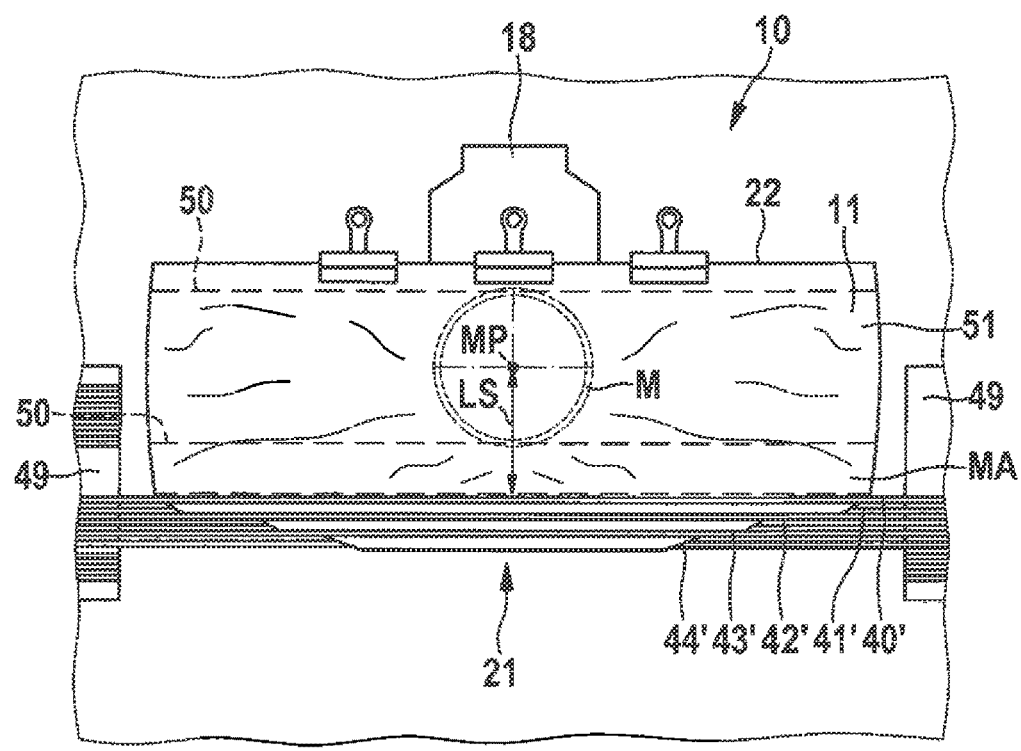

FIG. 4a illustrates that both the upper airbag portion 20 and the lower airbag portion 21 are folded, especially zigzag folded, in the direction of the transverse axis Q of the airbag 10.

The lower airbag portion 21 is equally zigzag folded, with the folding operation being carried out by means of five folding blades 40', 41', 42', 43', 44'.

When zigzag folding the second airbag portion 21, the first folding blade 40' is arranged to be further distant from the center point MP of the airbag 10 than is the first folding blade 40 when zigzag folding the first airbag portion 20.

A perpendicular LS from the center point MP of the airbag 10 to the first folding blade 40' especially amounting to 120 mm is adjusted, wherein between the first folding blade 40' and the center point MP of the airbag 10 a broadened center strip portion MA is formed. Said broadened center strip portion MA constitutes a broadening of the center strip 51.

Figure 4B:
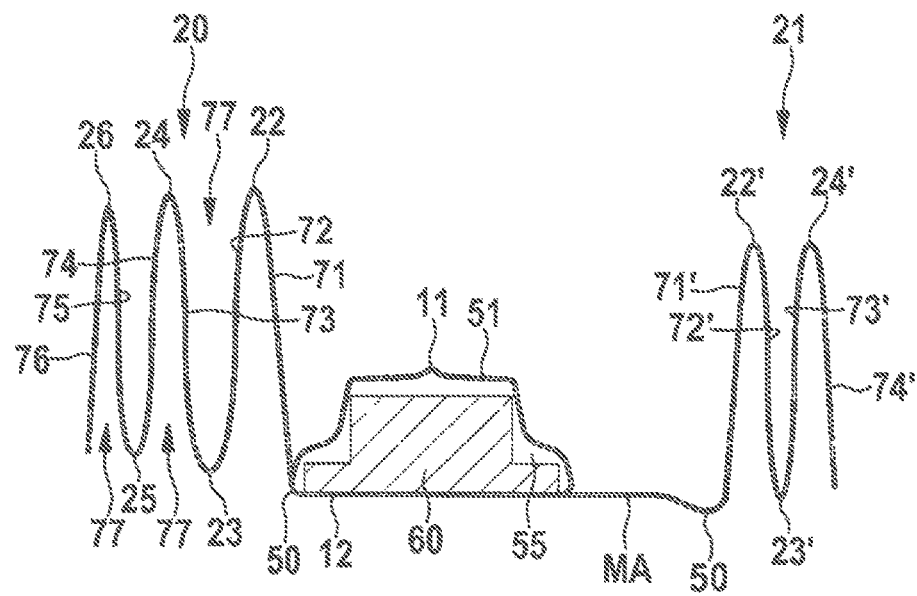

In FIG. 4b depicting a sectional view, the upper airbag portion 20 and the lower airbag portion 21 are shown in the folded state. In the clearance 55 formed by the front airbag layer 11 and the rear airbag layer 12 an airbag inflator 60 is placed. Equally, the center strip 51 which is not folded or, resp., is unfolded is visible. The center strip 51 is constituted by the two lateral edges 50 on each of which folding blades stood upright in the previous method steps. The upper airbag portion 20 includes a first folding bend 22, a second folding bend 23, a third folding bend 24, a fourth folding bend 25 and a sixth folding bend 26.

There are equally evident the first folding portion 71, the second folding portion 72, the third folding portion 73, the fourth folding portion 74, the fifth folding portion 75 as well as the sixth folding portion 76. The folding portions 71-76 are interconnected by the folding bends 22-26. In total five folding bends 22-26 as well as six folding portions 71-76 are formed by six folding blades 40-45. The openings 77 of the foldings are configured to be perpendicular to the support surface 15 according to the representation of FIG. 4b.

The lower airbag portion 21, too, includes three folding bends 22', 23' and 24' as well as the folding portions 71', 72', 73' and 74'. Also in this respect it is true that the openings 77 of the folds are configured to be parallel to the support surface 15.

Figure 5A:
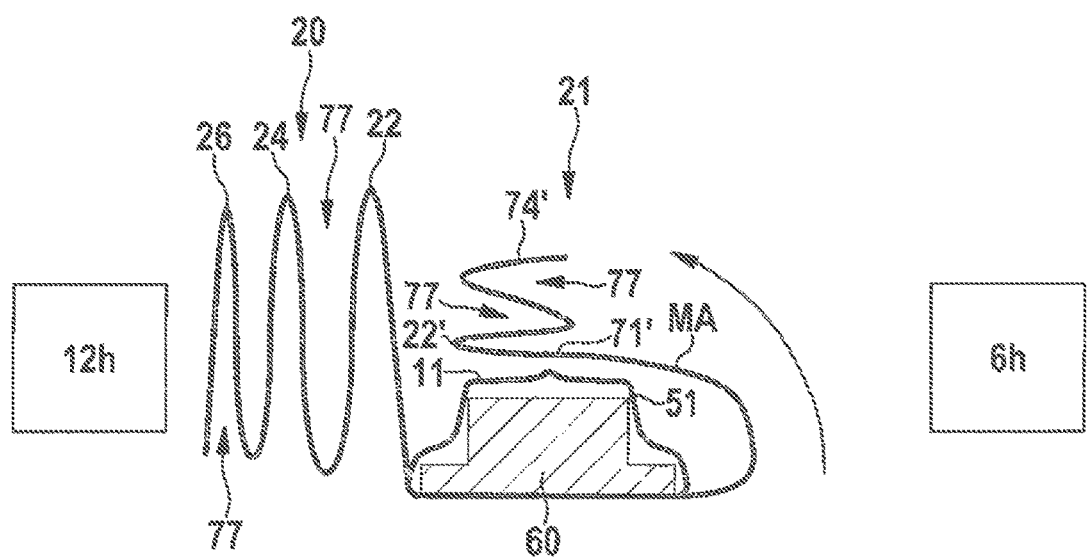

The respective first folding portions 71, 71' of the upper airbag portion 20 as well as of the lower airbag portion 21 are subsequently turned over in the direction of the transverse axis Q such that they rest on the center strip 51 and the broadened center strip portion MA, respectively. This is illustrated in detail in FIGS. 5a to 5c.

First (FIG. 5a) the folded lower airbag portion 21 is laid in the arrow direction in the direction of the transverse axis Q of the airbag 10 so that initially the broadened center strip portion MA and/or the first folding portion 71' is guided in the direction of the transverse axis Q of the airbag 10, while the center strip portion MA rests on the center strip 51. The lower airbag portion 21 covers the inflator 60 at least in portions. In other words, the lower airbag portion 21 rests on the portion of the front airbag layer 11 which is configured above the inflator 60.

Figure 5B:
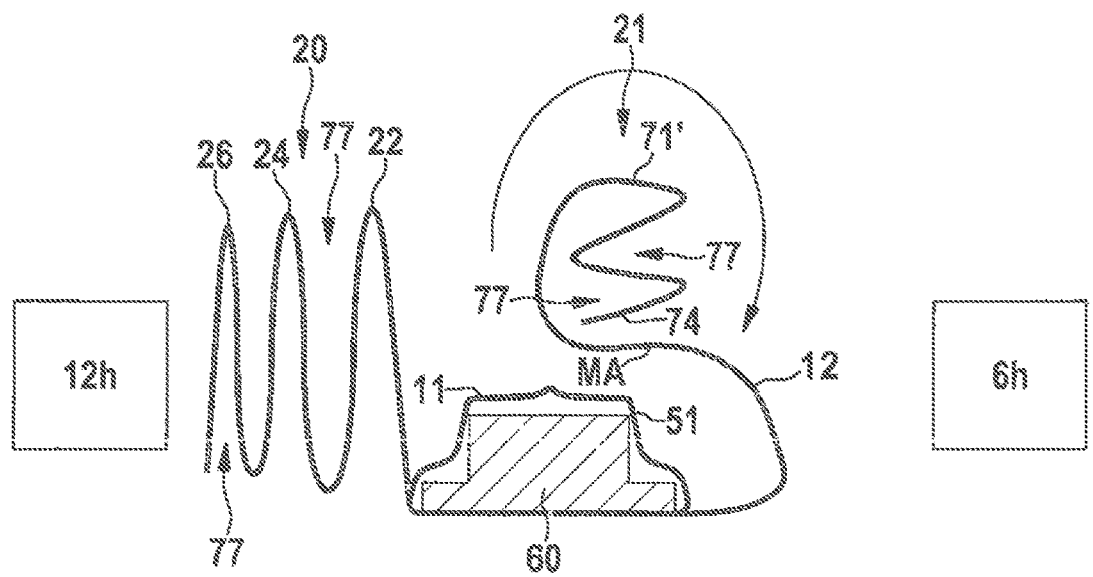

As is shown in FIG. 5b, the last, especially the fourth, folding portion 74' is turned over so that it comes to rest on the rear airbag layer 12 of the broadened center strip portion MA. Accordingly, the lower airbag portion 21 is turned over so that the first folding portion 71' is configured as the uppermost folding portion of the lower airbag portion 21. The openings 77 of the foldings are configured to be parallel to the support surface 15 after the method step shown in FIG. 5b at the latest.

Figure 5C:
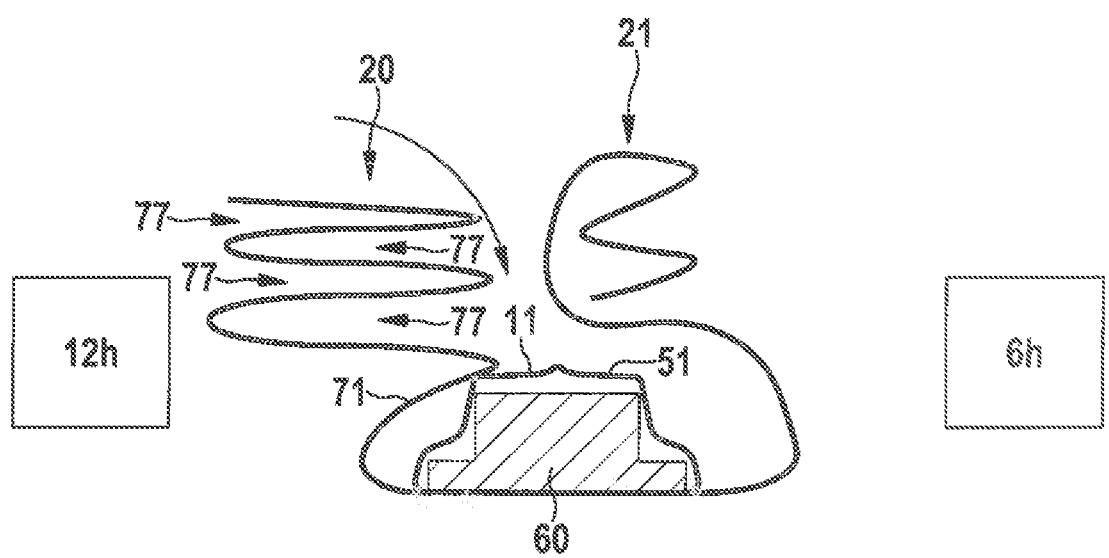

FIG. 5c illustrates a last sub-step of step b) to be carried out prior to step c). The folding portions 71, 72, 73, 74, 75, 76 of the first airbag portion 20 are turned over in the direction of the transverse axis Q so that the first folding portion 71 rests on the center strip 51, wherein moreover the folding blades 40, 41, 42, 43, 44, 45, 46 are removed. The openings 77 of the foldings are configured to be in parallel to the support surface 15 after this sub-step.

Figure 6A:
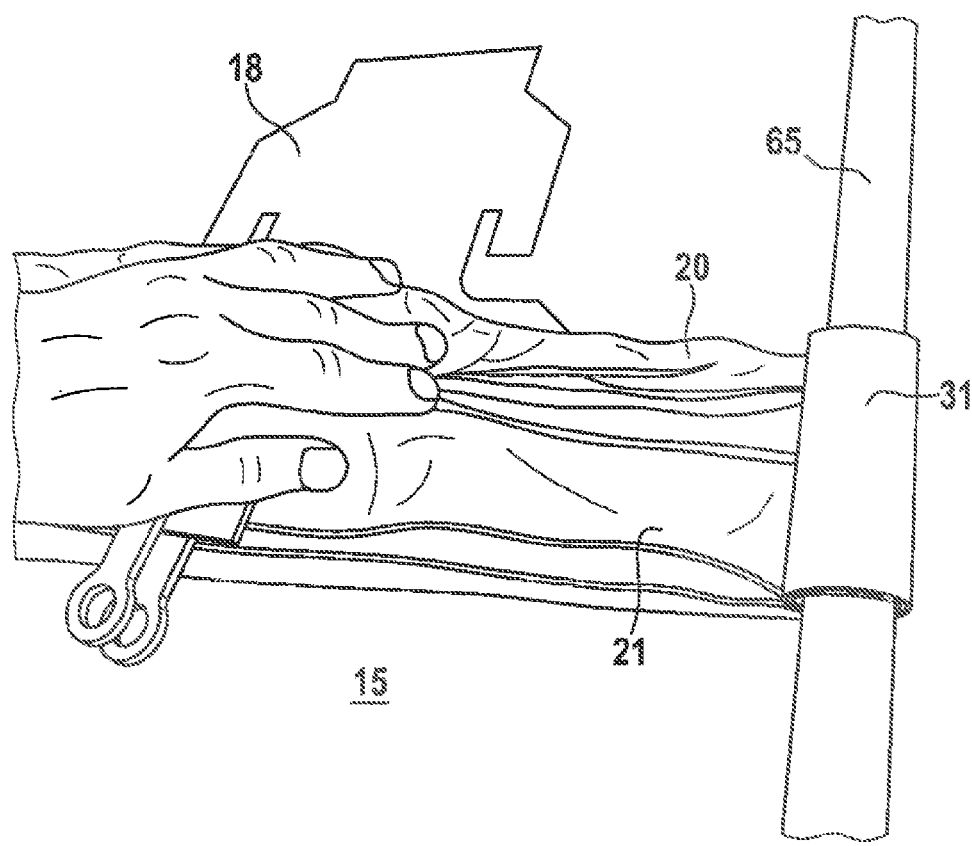

FIG. 6a illustrates a sub-step of step c). Accordingly, the right-hand lateral airbag portion 31, especially the 3 o'clock position portion of the airbag 10, is furled starting from the lateral edge 14 of the airbag 10 by means of a roll blade 65 especially in the form of a ruler in the direction of the longitudinal axis L of the airbag 10.

It is shown that the right-hand lateral airbag portion 31 is not completely furled. Rather, the inflator 60 is not covered by the right-hand lateral airbag portion 31 at least in portions. In other words, the inflator 60, especially the portion of the front airbag layer 11 and, resp., the portions of the upper airbag portion 20 as well as of the lower airbag portion 21 arranged above the inflator 60, remain free from the right-hand lateral airbag portion 31.

Figure 6B:
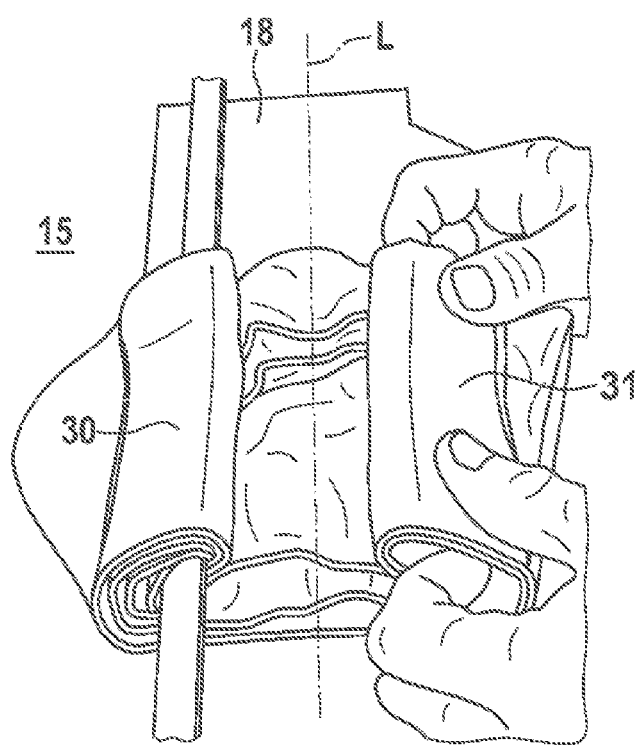

As is illustrated in FIG. 6b, also the left-hand lateral airbag portion 30 is furled in the direction of the longitudinal axis L of the airbag 10 as in the manner shown in FIG. 8a. The inflator 60, especially the portion of the front airbag layer 11 arranged above the inflator 60 and, resp., the portions of the upper airbag portion 20 and of the lower airbag portion 21 arranged above the inflator 60, at least in portions remain free from the left-hand lateral airbag portion 30.

Figure 6C:
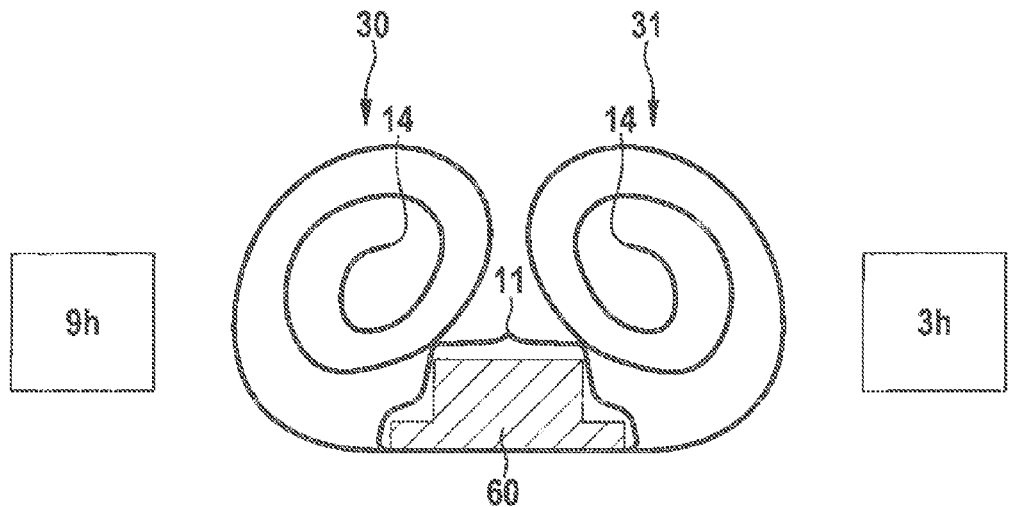

FIG. 6c illustrates the furled state of the left-hand lateral airbag portion 30 and of the right-hand lateral airbag portion 31.

Figure 7:
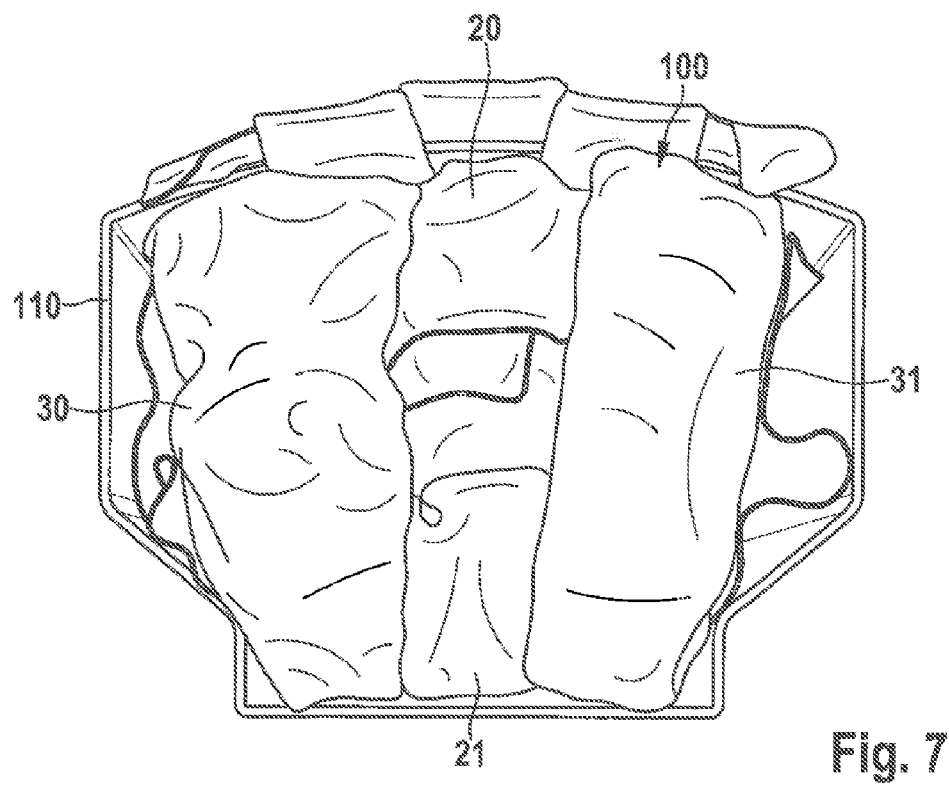
FIG. 7 shows a folded airbag.

FIG. 7 shows a folded airbag 100. Each of the upper airbag portion 20 and the lower airbag portion 21 is zigzag folded. The left-hand lateral airbag portion 30 and the right-hand lateral airbag portion 31 are furled toward the middle and, resp., toward the longitudinal axis L of the airbag 10. The folded airbag 100 is provided within a module casing 110. The folded airbag 100 requires relatively little space. It is additionally characterized by a directed inflating behavior.

LIST OF REFERENCE NUMERALS 10 airbag
11 front airbag layer
12 rear airbag layer
13, 13' tether device
14 lateral edge
15 support surface
18 airbag sheath
19 edge portion
20 upper airbag portion
21 lower airbag portion
22, 22' first folding bend
23, 23' second folding bend
24, 24' third folding bend
25 fourth folding bend
26 fifth folding bend
30 left-hand lateral airbag portion
31 right-hand lateral airbag portion
40, 40' first folding blade
41, 41' second folding blade
42, 42' third folding blade
43, 43' fourth folding blade
44, 44' fifth folding blade
45 sixth folding blade
46 seventh folding blade
49 holding fixture
50 lateral edge
51 center strip
55 clearance
60 inflator
65 roll blade
71, 71' first folding portion
72, 72' second folding portion
73, 73' third folding portion
74, 74' fourth folding portion
75 fifth folding portion
76 sixth folding portion
77 opening of folding
100 folded airbag
110 module casing
B width of airbag
L longitudinal axis
LK length of folding blade
LS perpendicular
M middle of airbag
MA center strip portion
MP center point of airbag
Q transverse axis

The invention claimed is:

1. A method of folding an airbag (10) for a driver airbag module, comprising a front airbag layer (11) connected at least in portions to a rear airbag layer (12), the method comprising the following steps of:
   a) flatly spreading the airbag (10) on a support surface (15) so that the front airbag layer (11) comes to rest on the rear airbag layer (12),
   b) zigzag folding each of an upper airbag portion (20) and a lower airbag portion (21) multiple times in the direction of a transverse axis (Q) of the airbag (10), the zigzag folded upper airbag portion (20) including a first folded portion (71) and the zigzag folded lower airbag portion (21) including a first folded portion (71'),
   c) turning over each first folded portion (71, 71') in the direction of the transverse axis (Q) such that the remainder of the zigzag folded upper airbag portion (20) extends into the first folded portion (71) and the remainder of the zigzag folded lower airbag portion (21) extends into the first folded portion (71'),
   d) furling each of a left-hand lateral airbag portion (30) and a right-hand lateral airbag portion (31) in the direction of a longitudinal axis (L) of the airbag (10).

2. The method according to claim 1, wherein the longitudinal axis (L) and the transverse axis (Q) extend substantially perpendicularly to each other, the longitudinal axis (L) extending through a 6 o'clock position and a 12 o'clock position of the airbag (10) and the transverse axis (Q) extending through a 3 o'clock position and a 9 o'clock position of the airbag (10), and/or wherein the airbag (10) includes at least one gas discharge device at the 12 o'clock position of the airbag (10) and/or extending from the middle (M) to the 12 o'clock position of the airbag (10), and/or wherein a tether device (13) is positioned so that it extends on the longitudinal axis (L) or substantially in parallel to the longitudinal axis (L), and/or wherein prior to the step a) at least one of an inflator (60) and an airbag fixture is placed in a clearance (55) formed by the front airbag layer (11) and the rear airbag layer (12), and/or wherein between the upper airbag portion (20) and the lower airbag portion (21) a non-reversed center strip (51) extending on the transverse axis (Q) or in parallel to the transverse axis (Q) is formed, and/or wherein step b) comprises zigzag folding a first airbag portion corresponding one of the lower airbag portion (21) and the upper airbag portion (20), aligning a first folding blade (40) substantially in parallel to the transverse axis (Q) and put substantially perpendicularly onto the front airbag layer (11) so that a first lateral edge (50) of the center strip (51) is formed, wherein subsequently the first airbag portion is folded in the direction of the first folding blade (40) so that the front airbag layer (11) is laid over the first folding blade (40) and at least one surface portion of the rear airbag layer (12) is aligned substantially perpendicularly to the support surface (15).

3. The method according to claim 2 wherein a second folding blade (41) is put against the surface portion of the rear airbag layer (21) and subsequently the first airbag portion is laid over the second folding blade (41) so that between the first folding blade (40) and the second folding blade (41) the first folding portion (71) is formed and above the second folding blade (41) a first folding bend (22) is formed and adjacent to the first folding bend (22) a second folding portion (72) is formed, and wherein a third folding blade (42) is put against the second folding portion (72) and subsequently the first airbag portion is folded in the direction of the third folding blade (42) so that the front airbag layer (11) is laid over the third folding blade (42) and at least one surface portion of the rear airbag layer (12) is aligned substantially perpendicularly to the support surface (15) and subsequently a fourth folding blade (43) is put against the surface portion of the rear airbag layer (12) and subsequently the first airbag portion is laid over the fourth folding blade (43) so that beneath the third folding blade (42) a second folding bend (23) is formed and between the third folding blade (42) and the fourth folding blade (43) a third folding portion (73) is formed and above the fourth folding blade (43) a third folding bend (24) is formed and adjacent to the third folding bend (24) a fourth folding portion (74) is formed, and wherein the steps for zigzag folding are carried out by at least six folding blades (40, 41, 42, 43, 44, 45) so many times that at least five folding bends (22, 23, 24, 25, 26) and at least six folding portions (71, 72, 73, 74, 75, 76) are formed, and wherein prior to carrying out step d) the folding portions (71, 72, 73, 74, 75, 76) of the first airbag portion are turned over in the direction of the transverse axis (Q) such that the first folding portion (71) rests on the center strip (51), wherein the folding blades (40, 41, 42, 43, 44, 45) are removed, and wherein step b) further comprises zigzag folding a second airbag portion corresponding to the other of the lower airbag portion (21) and the upper airbag portion (20), a seventh folding blade (40') is aligned substantially in parallel to the transverse axis (Q), is placed substantially perpendicularly onto the front airbag layer (11) so that a second lateral edge (50) of the center strip (51) is formed, wherein subsequently the second airbag portion is folded in the direction of the seventh folding blade (40') so that the front airbag layer (11) is laid over the seventh folding blade (40') and at least one surface portion of the rear airbag layer (12) is aligned substantially perpendicularly to the support surface (15), wherein the seventh folding blade (40') during zigzag folding of the second airbag portion is arranged further distant from the center point (MP) of the airbag (10) than the first folding blade (40) during zigzag folding of the first airbag portion, and wherein during zigzag folding of the second airbag portion a perpendicular (LS) from the center point (MP) of the airbag (10) to the seventh folding blade (40') is adjusted to 90 mm-150 mm, wherein a broadened center strip portion (MA) is formed between the seventh folding blade (40') and the center point (PM) of the airbag (10).

4. The method according to claim 3, wherein the first airbag portion is the upper airbag portion (20) comprising a 12 o'clock position portion of the airbag, and the second airbag portion is the lower airbag portion (21) comprising a 6 o'clock position portion of the airbag.

5. The method according to claim 3, wherein, during zigzag folding of the second airbag portion the perpendicular (LS) from the center point (MP) of the airbag (10) to the seventh folding blade (40') is adjusted to 120 mm.

6. The method according to claim 3, wherein a eighth folding blade (41') is put against the surface portion of the rear airbag layer (12) and subsequently the second airbag portion is laid over the eighth folding blade (41') so that between the seventh folding blade (40') and the eighth folding blade (41') the first folding portion (71') is formed and above the eighth folding blade (41') a first folding bend (22') is formed and adjacent to the first folding bend (22') a second folding portion (72') is formed, and wherein a ninth folding blade (42') is put against the second folding portion (72') and subsequently the second airbag portion is folded in the direction of the ninth folding blade (42') so that the front airbag layer (11) is laid over the ninth folding blade (42') and at least one surface portion of the rear airbag layer (12) is aligned substantially perpendicularly to the support surface (15) and subsequently a tenth folding blade (43') is put against the surface portion of the rear airbag layer (12) and subsequently the second airbag portion is laid over the tenth folding blade (43') so that beneath the ninth folding blade (42') a second folding bend (23) is formed and between the ninth folding blade (42') and the tenth folding blade (43') a third folding portion (73') is formed and above the tenth folding blade (43') a third folding bend (24') is formed and adjacent to the third folding bend (24') a fourth folding portion (74') is formed, and wherein prior to carrying out step d), the folded second airbag portion is laid in the direction of the transverse axis (Q) of the airbag (10) so that initially the broadened center strip portion (MA) and/or the seventh folding portion (71') is/are guided in the direction of the transverse axis (Q) of the airbag (10) so as to subsequently position a last, fourth folding portion (74') onto the rear airbag layer (12) of the broadened center strip portion (MA) and/or of the first folding portion (71'), and wherein step d) comprises furling a left-hand lateral airbag portion (30) and/or a right-hand lateral airbag portion (31) in the direction of the longitudinal axis (L) of the airbag (10) starting from a lateral edge (14), wherein the inflator (60) which is placed in the clearance (55) formed by the front airbag layer (11) and the rear airbag layer (12) at least in portions is not covered by the left-hand (30) and/or right-hand lateral airbag portion (31).

7. The method according to claim 6, wherein step d) further comprises furling the left-hand lateral airbag portion (30) and/or a right-hand lateral airbag portion (31) using a roll blade (65).

8. The method according to claim 6, wherein furling a left-hand lateral airbag portion (30) comprises furling a 9 o'clock position portion of the airbag (10), and furling a right-hand lateral airbag portion (31) comprises furling 3 o'clock position portion of the airbag (10).

9. An airbag (100) folded according to the method of claim 1.

10. A vehicle safety system comprising a driver airbag module including an airbag (100) folded according to the method of claim 1.

11. A folded airbag (100) for a driver airbag module, comprising a front airbag layer (11) which is connected at least in portions to a rear airbag layer (12) and includes an upper airbag portion (20), a lower airbag portion (21), a left-hand lateral airbag portion (30), and a right-hand lateral airbag portion (31), wherein each of the upper airbag portion (20) and the lower airbag portion (21) are folded multiple times to include respective first folded portions (71, 71') which are turned over such that the remainder of the folded upper airbag portion (20) extends into the first folded portion (71) and the remainder of the folded lower airbag portion (21) extends into the first folded portion (71'), each of the left-hand lateral airbag portion (30) and the right-hand lateral airbag portion (31) being furled in the direction of the middle (M) of the airbag (10).

12. The airbag (100) according to claim 11 wherein the upper airbag portion (20) and the lower airbag portion (21) are zigzag folded.

13. The airbag (100) according to claim 11 wherein one of the upper airbag portion (20) and the lower airbag portion (21) is folded so that the first folding portion (71, 71') of the one of the upper airbag portion (20) and the lower airbag portion (21) rests on a center strip (51) of the front airbag layer (11) such that an inflator (60) placed in a clearance (55) formed by the front airbag layer (11) and the rear airbag layer (12) is covered at least in portions by the one of the upper airbag portion (20) and the lower airbag portion (21).

14. The airbag according to claim 11 wherein one of the upper airbag portion (20) and the lower airbag portion (21) is folded so that a broadened center strip portion (MA) rests on a center strip (51) such that an inflator (60) placed in a clearance (55) formed by the front airbag layer (11) and the rear airbag layer (12) is covered at least in portions by the upper airbag portion (20) or the lower airbag portion (21), wherein a last folding portion (74') viewed starting from the middle (M) of the airbag (10) rests on the rear airbag layer (12) of the broadened center strip portion (MA) and/or the first folding portion (71'), and wherein the inflator (60) placed in the clearance (55) formed by the front airbag layer (11) and the rear airbag layer (12) is not covered at least in portions by the left-hand lateral airbag portion (30) and/or the right-hand lateral airbag portion (31).

15. An airbag module for being arranged within a steering wheel, comprising an airbag (100) according to claim 11.

16. A vehicle safety system comprising a driver airbag module including an airbag (100) according to claim 11, and comprising at least one sensor unit for detecting data as well as an electronic decision-making unit adapted to incorporate the data detected by the sensor unit to define the presence of a trigger case for the airbag module and to transmit a trigger signal for triggering the airbag module.

\* \* \* \* \*